United States Patent [19]

Bartels et al.

[11] Patent Number: 4,941,609

[45] Date of Patent: Jul. 17, 1990

[54] METHOD AND APPARATUS FOR CONTROLLING FIRING RATE IN A HEATING SYSTEM

[75] Inventors: James I. Bartels, Hudson; Michael J. Seidel, Wauwatosa; Paul A. Schimbke, Shorewood, all of Wis.

[73] Assignee: Honeywell Inc., Minneapolis, Minn.

[21] Appl. No.: 303,438

[22] Filed: Jan. 27, 1989

[51] Int. Cl.$^5$ .............................. G05D 15/00
[52] U.S. Cl. .......................... 236/78 D; 237/8 R; 364/557
[58] Field of Search ............... 236/78 D, 26 A, 26 R, 236/26 E, 15 R, 94; 237/8 R, 8 A, 8 B, 65; 122/448 R; 364/157, 557; 318/619

[56] References Cited

U.S. PATENT DOCUMENTS

| | | | |
|---|---|---|---|
| 4,403,293 | 9/1983 | Bradt et al. | 364/494 |
| 4,451,003 | 5/1984 | de Mena et al. | 236/14 |
| 4,457,266 | 7/1984 | La Spisa | 122/451.1 |
| 4,547,826 | 10/1985 | Premerlani | 361/25 |
| 4,574,746 | 3/1986 | Keyes, IV et al. | 122/448 |
| 4,575,803 | 3/1986 | Moore | 364/551 |
| 4,583,684 | 4/1986 | Watabe | 236/78 |
| 4,589,060 | 5/1986 | Zinsmeyer | 364/148 |
| 4,639,882 | 1/1987 | Keats | 364/550 |
| 4,787,554 | 11/1988 | Bartels et al. | 236/26 R |

*Primary Examiner*—Henry A. Bennet
*Assistant Examiner*—John Sollecito
*Attorney, Agent, or Firm*—Kinney & Lange

[57] ABSTRACT

A method and apparatus control firing rate in a heating system to compensate for thermal mass characteristics of the heating system. The thermal mass characteristics of the heating system are derived from heating system identification information. A weighted control response factor is selected which is representative of load characteristics of a load type affecting firing rate control and which is representative of desired control tightness. The firing rate is varied, based on the weighted control response factor and the thermal characteristics, to match the heating system, the load type being controlled and the desired control tightness for optimum control.

4 Claims, 4 Drawing Sheets

A. $TSET = [-8523.83/(LN(SETPOINT + 14.7) - 15.427)] - 459.67$

B. $1/2TBAND = 21/(RESPONSE^e + 3.5) - .04$

C. $PBAND = 2(SETPOINT - e^x + 14.7)$
where $x = -8523.83/(TSET - 1/2TBAND + 459.67) + 15.4287$ D. $HYS = 5 + 15(5 - RESPONSE)$
$HYS > 50$ then $HYS = 50$
$HYS = 20$ THEN $HYS = 15$ A. $TSET = \left[-8523.83/(LN(SETPOINT + 14.7) - 15.427\right] - 459.67$ B. $1/2TBAND = .21/(RESPONSE^e + 3.5) - .04$ C. $PBAND = 2(SETPOINT - e^x + 14.7)$
where $x = -8523.83/(TSET - 1/2TBAND + 459.87) + 15.4287$ D. HYS = 5 + 15(5 - RESPONSE)
HYS > 50 then HYS = 50
HYS = 20 THEN HYS = 15

METHOD AND APPARATUS AND CONTROLLING FIRING RATE IN A HEATING SYSTEM

BACKGROUND OF THE INVENTION

1. Field of the Invention

The present invention is a method and apparatus for controlling a heating system. More particularly, the present invention is an improved method for controlling firing rate in a heating system.

2. Description of the Prior Art

Optimum pressure or temperature control of a boiler is typically done by varying a firing rate (i.e., the rate at which fuel and oxygen are provided to a combustion chamber) of a burner which is used to provide heat to the boiler. The firing rate is varied by modulating fuel valves and air dampers so that energy input matches energy output.

Optimum pressure or temperature control of a boiler cannot be achieved without taking into consideration thermal mass characteristics of the boiler under control and dynamics of the load being controlled. Thermal mass is defined as the weight of water in the boiler divided by the maximum heating capacity of the burner which heats the water. The Bartels et al U.S. Pat. No. 4,787,544 discloses a firing rate control system which controls firing rate as a function of the thermal mass.

However, thermal mass of a boiler varies with the boiler type and model of each manufacturer. The thermal mass for a particular boiler is generally not known by a boiler operator and has, in the past, been estimated using various methods to test the particular boiler for thermal mass. These test methods have proven to be both time consuming and subject to error particularly if the output rate of the boiler changes during the test.

Additionally, load characteristics and desired control tightness for any particular heating system are application dependent. In other words, in many cases optimum control is not required and minimizing modulation (i.e., motor repositions in the heating system which adjust firing rate) may be more important than extremely tight control. Generally, since looser control in the heating system corresponds to fewer motor repositions, the most loose control tolerable should be used in order to minimize mechanical wear of the firing rate modulation motor and other mechanical components.

SUMMARY OF THE INVENTION

The present invention is based on the recognition that there is a need for a firing rate control system which quickly derives an accurate thermal mass corresponding to the precise boiler being controlled. Additionally, the firing rate control system should not only control firing rate based on thermal mass but on other load characteristics and desired control tightness to the match the heating system, the load type being controlled and the desired control tightness for desired control.

In the present invention, improved control of firing rate in a heating system to compensate for thermal mass characteristics of the heating system is achieved. The thermal mass characteristics of the heating system are derived from heating system identification information. A weighted control response factor is selected which is representative of load characteristics of a load type affecting firing rate control and which is also representative of desired control tightness. The firing rate is varied, based on the weighted control response factor and the thermal mass characteristics, to match the heating system, the load type being controlled and the desired control tightness for desired control.

DETAILED DESCRIPTION OF THE PREFERRED EMBODIMENTS

Figure 1:
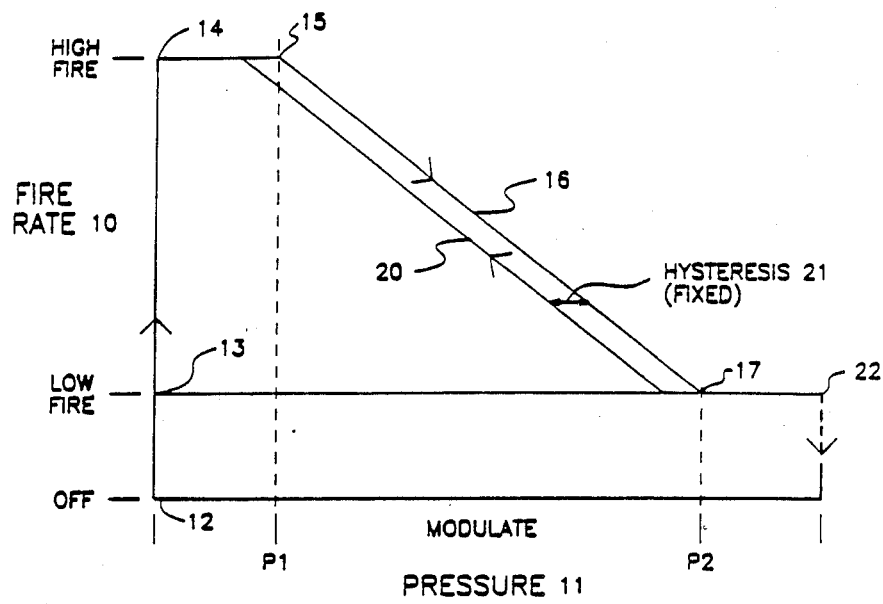
FIG. 1 is a graph of a prior art pressurebased heating system.

FIG. 1 shows a graph of a conventional control loop with firing rate 10 of the heating system plotted against pressure 11 within a boiler in the heating system. When a burner is activiated at point 12, fuel valves and air dampers are positioned so that the burner operates at a high fire state 14. During the high fire state, pressure builds up in the boiler, which is heated by the burner, to point 15 where a pressure point P1 is reached. P1 represents the beginning of a modulating range within which the boiler is operated.

The pressure varies along curve 16 depending on the position of the fuel valves and air dampers until a point 17 is reached which is the end of the modulation range and corresponds to pressure point P2. Modulation between points P1 and P2 is typically referred to as a differential or bandwidth for the heating system. Modulation within this range varies between curve 16 and curve 20 because of the natural hysteresis in components used to control the heating system. When pressure in the boiler reaches a breakpoint 22, the heating system turns off the burner and waits for a new heating cycle.

Figure 2:
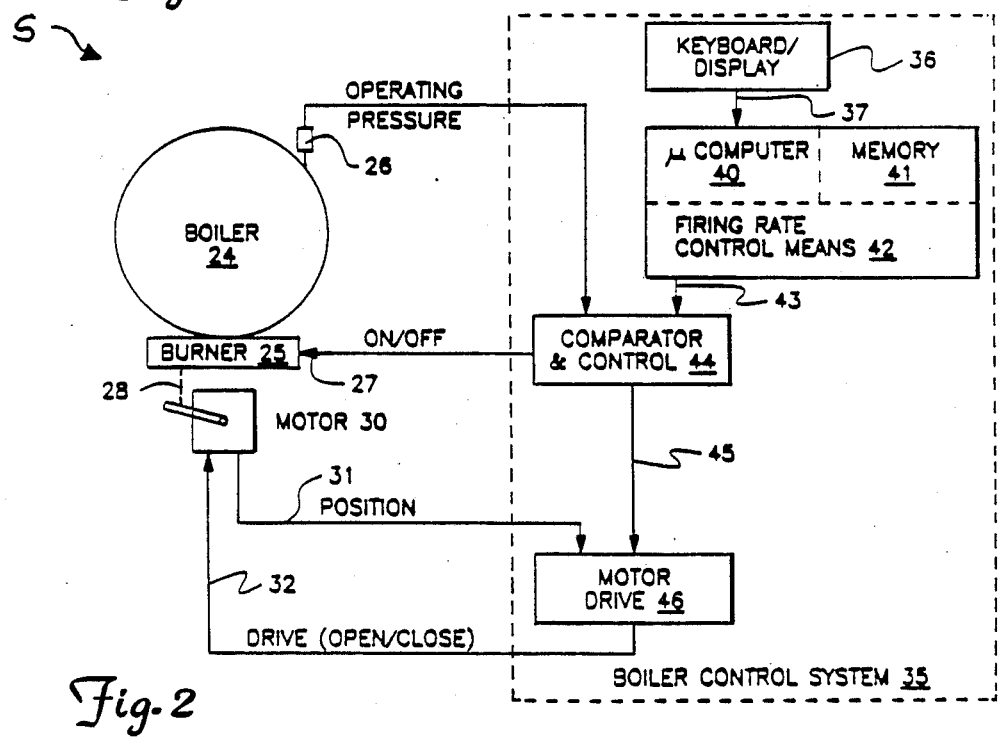
FIG. 2 is a block diagram of a boiler and a boiler control system.

FIG. 2 shows a block diagram of heating system S of the present invention. Boiler 24 is provided with heat from burner 25. Boiler 24 has a pressure measuring probe 26 which emits a pressure signal representative of operating pressure in boiler 24. Burner 25 has conventional valves and dampers and is operated in an on-off manner by a control signal 27 from boiler control system 35 and by modulating linkage 28 from modulating motor 30.

Modulating motor 30 has a position feedback signal 31 which is fed back to motor drive 46, in boiler control system 35, and also receives a drive signal 32 from motor drive 46.

Boiler control system 35 includes keyboard/display 36, microcomputer 40, memory 41, firing rate control means 42, comparator and control 44 and motor drive 46. Keyboard/display means 36 forms an input/output means for boiler control system 35. Keyboard/display means 36 is linked to microcomputer 40 at link 37. Microcomputer 40 includes all necessary operating hardware and software such as memory 41 and also includes a firing rate control means 42. Microcomputer 40, memory 41 and firing rate control means 42 provide an output signal 43 to comparator and control 44. Output signal 43 is in the form of a pressure bandwidth (PBAND) that is a computed function of a set point pressure in pounds per square inch (SETPOINT). The SETPOINT is entered as a specific pressure at keyboard/display 36 and output signal 43 is computed by microcomputer 40, memory 41 and firing rate control means 42 and represents the desired pressure operating band (PBAND). Output signal 43 is compared at comparator and control 44 to the actual operating pressure represented by the pressure signal emitted from sensor 26.

Based on this comparison, comparator 44 emits two signals. A first signal is control signal 27 which is provided to burner 25 and a second signal is motor drive control signal 45 which is provided to motor drive 46. Based on motor drive control signal 45 and position feedback signal 31, motor drive 46 is operated in a conventional, closed-loop manner.

Figure 3:
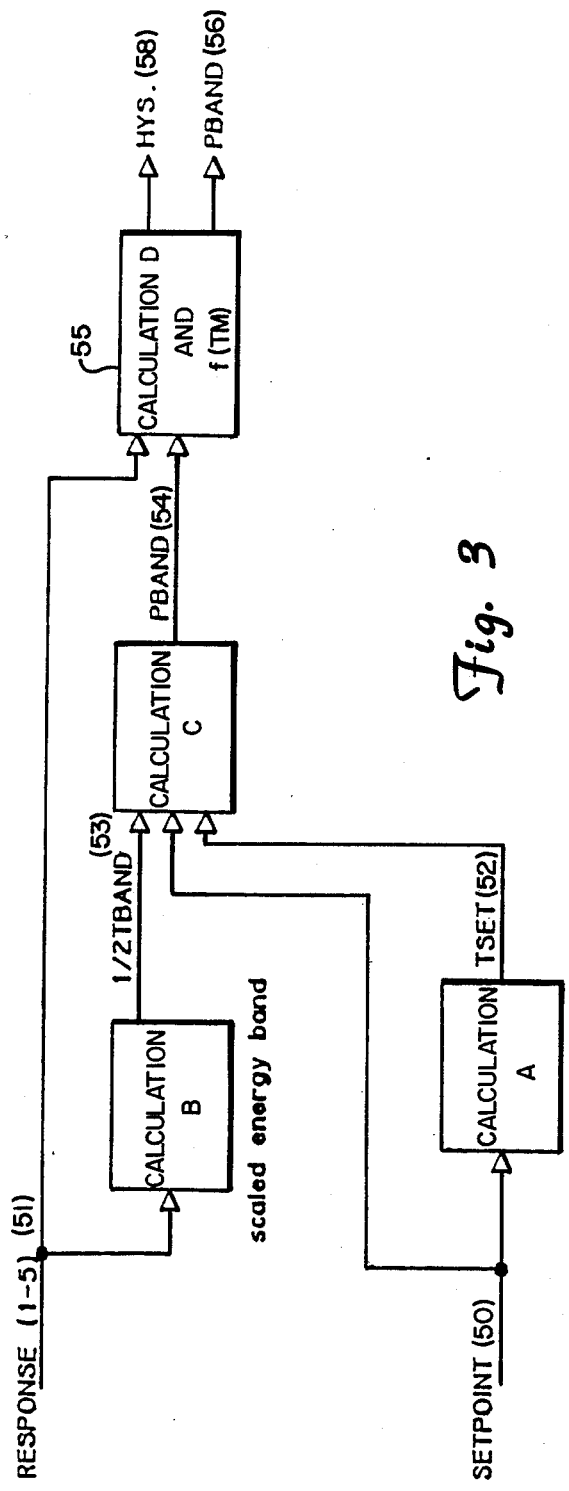
FIG. 3 is a flowchart of the operation of the firing rate control system of the present invention.

FIG. 3 is a flowchart which provides computations required for controlling the firing rate in heating system S in accordance with the present invention. SETPOINT 50, which was input at keyboard/display 36, is used in microcomputer 40, memory 41 and firing rate control means 42 in calculation A. Calculation A utilizes known thermal dynamic information to convert the pressure entered as SETPOINT 50 in pounds per square inch into temperature TSET 52. The formula for this computation is well known but is set out in FIG. 3.

Response 51, which was also an input at keyboard/display 36 is a weighted number, in this preferred embodiment, ranging from "1" to "5". A response of "1" provides loose setpoint tolerance and a wide control band of heating system S. Response "1" should be used where the load varies slowly and/or where wide pressure or temperature swings may be allowed.

On the other extreme, a response of "5" provides, in this preferred embodiment, tight setpoint control and a narrow control band. This should be used where loads change rapidly and/or where the boiler pressure or temperature must be held very steady. Responses of "2", "3" or "4", in this preferred embodiment, provide a gradient between the two extremes and allow for a compromise in control.

As discussed earlier, when response input 51 is a low number, fewer motor repositions of motor 30 are required and motor 30 undergoes less mechanical wear during operation of heating system S.

Microcomputer 40, memory 41 and firing rate control means 42 use response 51 in Calculation B to produce a temperature band for controlling the firing rate. This is designated as ½ TBAND 53.

SETPOINT 50, TSET 52 and ½ TBAND 53 are used by microcomputer 40, memory 41 and firing rate control means 42 in calculation C. Calculation C produces a pressure bandwidth PBAND 54.

Each particular type of boiler 24 has a design thermal mass which varies according to the boiler type, model number and manufacturer. It is desirable to control the firing rate and heating system S as a function of the design thermal mass. Therefore, a plurality of design thermal mass numerals which represent the design thermal mass of various boilers are stored (for example, in the form of a lookup table) in memory 41. Before operation of heating system S, an operator enters boiler identification information into boiler control system 35 via keyboard/display 36. The boiler identification information may include boiler model number and manufacturer as well as boiler type. Based on the boiler identification information, microcomputer 40 identifies and retrieves the design thermal mass of the particular boiler being controlled from memory 41 Based on that information, microcomputer 40, memory 41 and firing rate control means 42 calculate the final pressure bandwidth PBAND 56.

Additionally, the hysteresis of heating system S is calculated in block 55 by calculation D as a percentage of the bandwidth of heating system S. In this preferred embodiment, hysteresis 58 is set to a maximum value of 50% of bandwidth and a minimum value of 15%.

Figure 4:
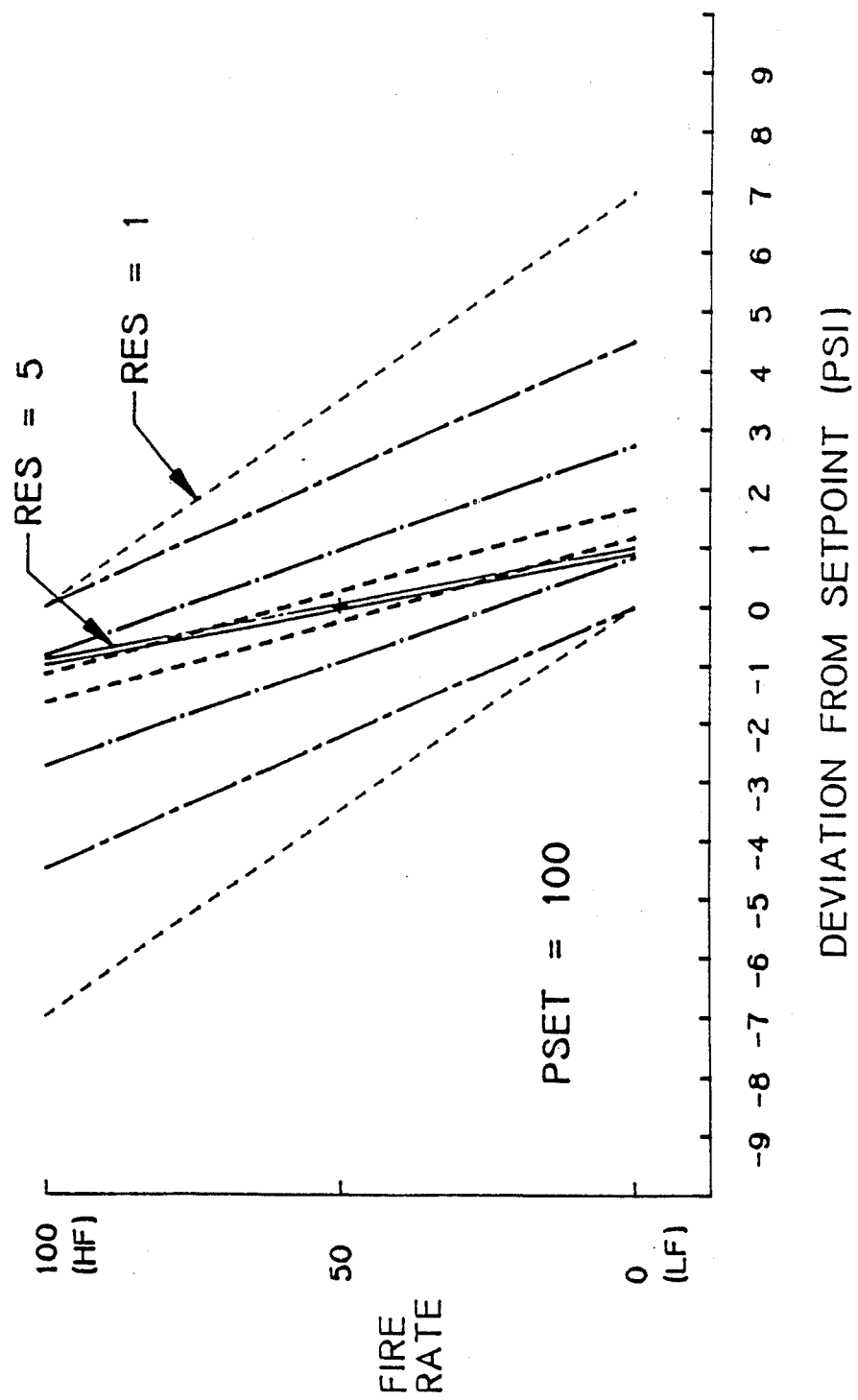
FIG. 4 is a graph of firing rate plotted against deviation from SETPOINT.

FIG. 4 is a graph of firing rate 10 plotted against deviation from SETPOINT in pounds per square inch. The graph is plotted showing response inputs "1" through "5" where SETPOINT equals 100.

Figure 5:
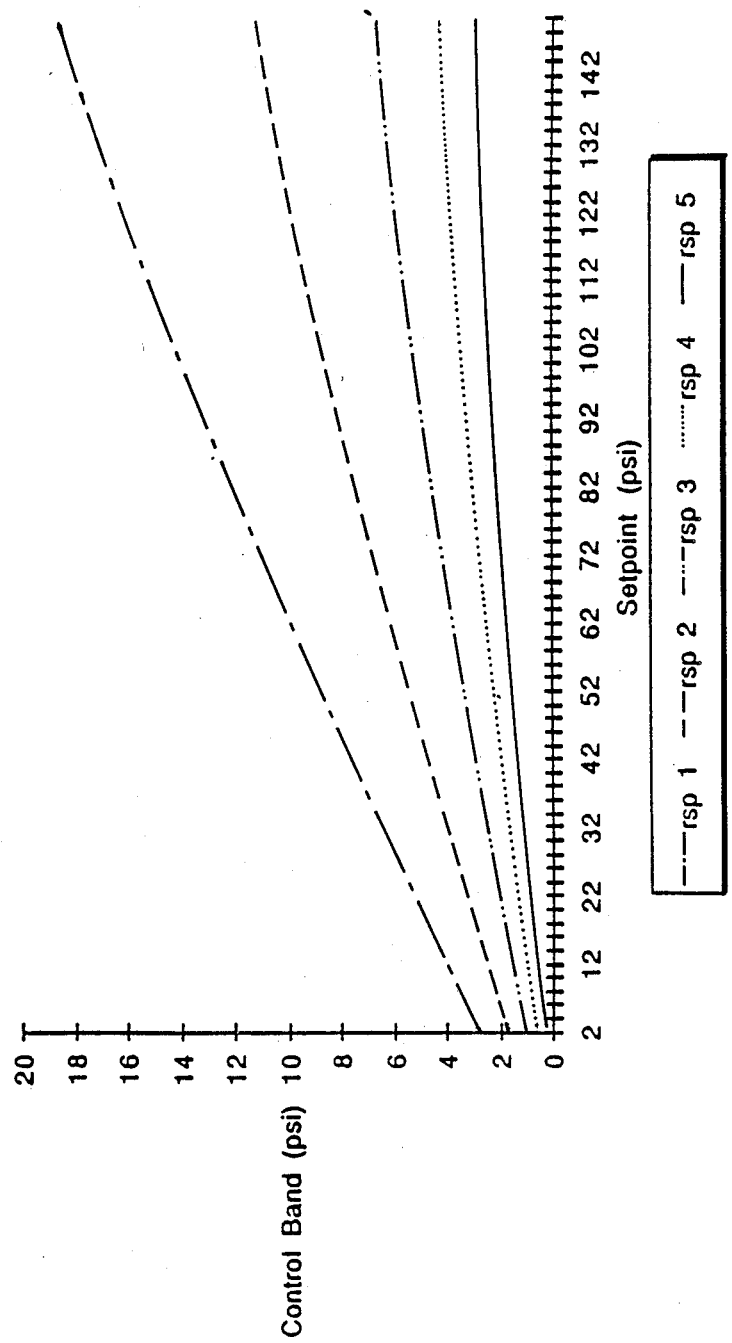
FIG. 5 is a graph of control band plotted against SETPOINT.

FIG. 5 is a graph showing a control band in pounds per square inch plotted against SETPOINT in pounds per square for response inputs equal "1" through "5".

Conclusion

The present invention is an improvement on a method for controlling firing rate in a heating system where the design thermal mass for the particular boiler type which is being controlled is derived from boiler identification information such as model number and boiler type. In turn, the design thermal mass derived is used to tailor firing rate control for optimum control in the heating system.

Additionally, the load type and desired control tightness are represented as a weighted response factor and provided to the heating system. Using this weighted response factor, the heating system controls the firing rate to match the particular load type and control tightness (bandwidth).

Although the present invention has been described with reference to preferred embodiments, workers skilled in the art will recognize that changes may be made in form and detail without departing from the spirit and scope of the invention.

What is claimed is:

1. In a method for controlling firing rate in a heating system to compensate for design thermal mass characteristics of the heating system, an improvement comprising the steps of:
   deriving the design thermal mass characteristics of the heating system from heating system identification information identifying the heating system to be controlled;
   selecting a weighted control response factor representative of load characteristics of a load type affecting firing rate control and representative of desired control tightness; and
   controlling the firing rate, based on the weighted control response factor and the design thermal mass characteristics, to match the heating system, the load type being controlled and the desired control tightness for desired control.

2. The method of claim 1 wherein the step of deriving the thermal mass characteristics further comprises the steps of:
   storing thermal mass characteristics for a plurality of heating systems in a heating system controller used to control the heating system;
   providing the controller with the heating system identification information corresponding to the heating system to be controlled by he controller; and
   providing the thermal mass characteristics of the heating system to be controlled based on the heating system identification information provided and the thermal mass characteristics stored.

3. In an apparatus for controlling firing rate in a heating system to compensate for design thermal mass characteristics of the heating system, an improvement comprising:
   deriving means for deriving the design thermal mass characteristics of the heating system for heating system identification information identifying the heating system to be controlled;
   selecting means for selecting a weighted control response factor representative of load characteristics of a load type affecting firing rate and representative of desired control tightness; and
   control means for controlling the firing rate, based on the weighted control response factor and the design thermal mass characteristics, to match the heating system, the load type and the desired control tightness for desired control.

4. The apparatus of claim 3 wherein the deriving means further comprises:
   means for storing thermal mass characteristics for a plurality of heating systems in a controller means used to control the heating system;
   means for providing the heating system identification information to the controller means, the heating system identification information corresponding to the heating system to be controlled by the controller; and
   means for providing the thermal mass characteristics of the heating system to be controlled based on the heating system identification information provided and the thermal mass characteristics for the plurality of heating systems.

* * * * *

UNITED STATES PATENT AND TRADEMARK OFFICE
CERTIFICATE OF CORRECTION

PATENT NO.   :   4,941,609

DATED        :   July 17, 1990

INVENTOR(S)  :   James I. Bartels et al.

It is certified that error appears in the above-identified patent and that said Letters Patent is hereby corrected as shown below:

Col. 4, line 63, delete "by he", insert --by the--

Signed and Sealed this

Seventeenth Day of September, 1991

Attest:

HARRY F. MANBECK, JR.

Attesting Officer

Commissioner of Patents and Trademarks